US012005710B2

(12) United States Patent
Tanaka et al.

(10) Patent No.: US 12,005,710 B2
(45) Date of Patent: Jun. 11, 2024

(54) LIQUID DISCHARGING APPARATUS

(71) Applicant: BROTHER KOGYO KABUSHIKI KAISHA, Nagoya (JP)

(72) Inventors: Nobumasa Tanaka, Nagoya (JP); Ryuji Horata, Gamagori (JP); Takafumi Nakase, Nagoya (JP); Masayoshi Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 93 days.

(21) Appl. No.: 17/931,613

(22) Filed: Sep. 13, 2022

(65) Prior Publication Data

US 2023/0089979 A1 Mar. 23, 2023

(30) Foreign Application Priority Data

Sep. 17, 2021 (JP) ................................ 2021-152444

(51) Int. Cl.
*B41J 2/14* (2006.01)

(52) U.S. Cl.
CPC .. *B41J 2/14314* (2013.01); *B41J 2002/14491* (2013.01)

(58) Field of Classification Search
CPC .......... B41J 2/14314; B41J 2002/14491; B41J 2/16517; B41J 2/2142
See application file for complete search history.

(56) References Cited

U.S. PATENT DOCUMENTS

2015/0246532 A1* 9/2015 Abe .................... H03K 17/687 347/9

FOREIGN PATENT DOCUMENTS

JP 2007-136858 A 6/2007
JP 2012-210768 A 11/2012

* cited by examiner

*Primary Examiner* — Bradley W Thies
(74) *Attorney, Agent, or Firm* — Scully, Scott, Murphy & Presser, PC

(57) ABSTRACT

There is provided a liquid discharging apparatus including: a liquid discharging head having a nozzle; an electrode; a voltage supplier; a first output part configured to output a first signal corresponding to an electric change, of the electrode or the liquid discharging head, caused in a case that the liquid discharging head performs inspection driving for discharging a liquid from the nozzle toward the electrode; a second output part connected to the electrode; a high pass filter; a third output part connected to the electrode via the high pass filter; and a controller. The controller is configured to: determine whether the liquid is normally discharged based on the first signal; and determine whether a short circuit is formed between the liquid discharging head and the electrode based on a second signal outputted from the second output part and a third signal outputted from the third output part.

13 Claims, 11 Drawing Sheets

LIQUID DISCHARGING APPARATUS

REFERENCE TO RELATED APPLICATIONS

This application claims priority from Japanese Patent Application No. 2021-152444 filed on Sep. 17, 2021. The entire content of the priority application is incorporated herein by reference.

BACKGROUND ART

An ink-jet printer, which performs the recording by discharging (jetting) an ink from nozzles, is known as an example of the liquid discharging apparatus for discharging a liquid from nozzles. In a certain ink-jet printer, an inspection area including an electrode member is provided in a capping member for covering the nozzles. Then, it is inspected whether or not the ink is discharged normally from the nozzles on the basis of the voltage change in the inspection area provided when a printing head is allowed to perform the operation in order to discharge the ink toward the inspection area from the nozzles in a state in which the electric potential difference is generated between the printing head and the inspection area. Further, the actually measured voltage is measured between the printing head and the inspection area when the inspection is performed as described above. Then, if the actually measured voltage is lower than an inspection allowable range, it is determined that the printing head and the electrode member form a short circuit and the leak current flows. Then, the printing head and the capping member are separated from each other, and the ink, which is pooled in the capping member, is discharged by a suction pump.

DESCRIPTION

In this context, in the case of an ink-jet printer described in Japanese Patent Application Laid-open No. 2007-136858, if the continuous short circuit is formed between the printing head and the inspection area, the leak current continuously flows between the printing head and the inspection area. Therefore, such a situation continues that the voltage between the printing head and the inspection area is lower than the inspection allowable range. Then, in the case of Japanese Patent Application Laid-open No. 2007-136858, it is determined whether or not the continuous short circuit is formed between the printing head and the inspection area on the basis of whether or not the voltage between the printing head and the inspection area is lower than the inspection allowable range. On the other hand, for example, the temporary short circuit is formed in some cases between the printing head and the inspection area, for example, on account of the temporary electric discharge between the printing head and the inspection area. In this case, the leak current merely flows temporarily between the printing head and the electrode member. Therefore, it is necessary to capture the temporary voltage change. However, in the case of the configuration for detecting the continuous short circuit between the printing head and the inspection area as described in Japanese Patent Application Laid-open No. 2007-136858, it is feared that the temporary voltage change as described above cannot be captured. If the temporary short circuit is formed between the printing head and the inspection area, it is feared that the similar temporary short circuit may be repeatedly formed, and/or the temporary short circuit may proceed to the continuous short circuit between the printing head and the inspection area. On this account, it is preferable that the formation of the short circuit between the printing head and the inspection area can be also detected for the case in which the temporary short circuit is formed between the printing head and the inspection area, in addition to the case in which the continuous short circuit is formed between the printing head and the inspection area.

An object of the present disclosure is to provide a liquid discharging apparatus which makes it possible to correctly detect the formation of the continuous short circuit and the formation of the temporary short circuit between a liquid discharging head and an electrode which receives the liquid discharged from nozzles.

According to the present disclosure, there is provided a liquid discharging apparatus including:

- a liquid discharging head having a nozzle configured to discharge a liquid;
- an electrode arranged so that the electrode is capable of being opposed to the nozzle;
- a voltage supplier configured to generate an electric potential difference between the liquid discharging head and the electrode by applying a voltage to the electrode;
- a first output part electrically connected to the electrode or the liquid discharging head, the first output part being configured to output a first signal corresponding to an electric change, of the electrode or the liquid discharging head electrically connected to the first output part, caused in a case that the liquid discharging head performs inspection driving for discharging the liquid from the nozzle toward the electrode while the liquid discharging head and the electrode are opposed to one another;
- a second output part electrically connected to the electrode;
- a high pass filter electrically connected to the electrode;
- a third output part electrically connected to the electrode via the high pass filter; and
- a controller, wherein:
- the controller is configured to:
  - determine whether or not the liquid is normally discharged from the nozzle based on the first signal; and
  - determine whether or not a short circuit is formed between the liquid discharging head and the electrode based on a second signal outputted from the second output part and a third signal outputted from the third output part.

According to the present disclosure, it is possible to determine whether or not the liquid is normally discharged from the nozzle on the basis of the first signal outputted from the first output part. Further, if the continuous short circuit is formed between the liquid discharging head and the electrode, the DC component of the voltage of the electrode is changed. In the present disclosure, the second output part is connected to the electrode, thus it is possible to detect the occurrence of the continuous short circuit between the liquid discharging head and the electrode on the basis of the second signal. Further, if the temporary short circuit is formed between the liquid discharging head and the electrode, then the voltage of the electrode is suddenly changed, and thus the high frequency component is generated in the voltage of the electrode. In the present disclosure, the third output part is connected to the electrode while allowing the high pass filter to intervene between the electrode and the third output part. Therefore, the third signal, which is outputted from the third output part, is the signal corresponding to the high frequency component of the voltage of the electrode. Accordingly, it is possible to detect the occurrence of the temporary short circuit between the liquid discharging head and the electrode on the basis of the third signal.

Figure 5A:
Figure 5B:
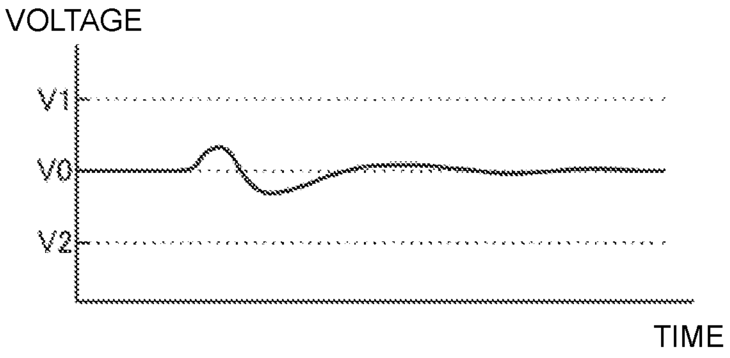
Figure 5C:
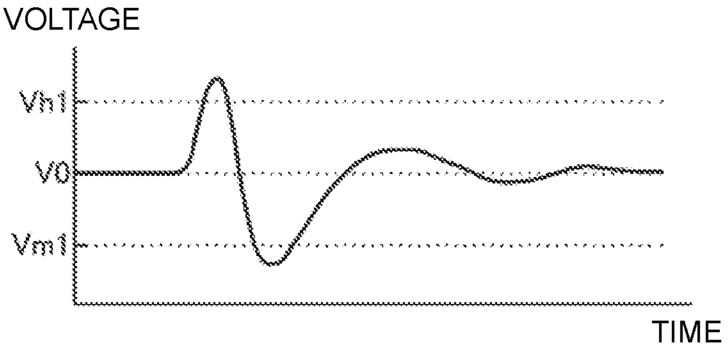

FIG. 5A is a drawing illustrative of a signal sent from a high pass filter to a first output part and a signal outputted from the first output part when no ink is discharged from nozzle in the inspection driving. FIG. 5B is a drawing illustrative of a signal sent from the high pass filter to the first output part when the ink is discharged from the nozzle in the inspection driving. FIG. 5C is a drawing illustrative of a signal outputted from the first output part when the ink is discharged from the nozzle in the inspection driving.

Figure 6:
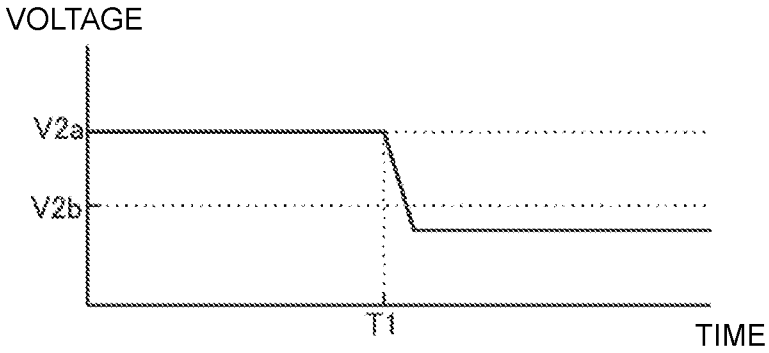

FIG. 6 is a drawing illustrative of a signal outputted from a second output part.

Figure 7A:
Figure 7B:
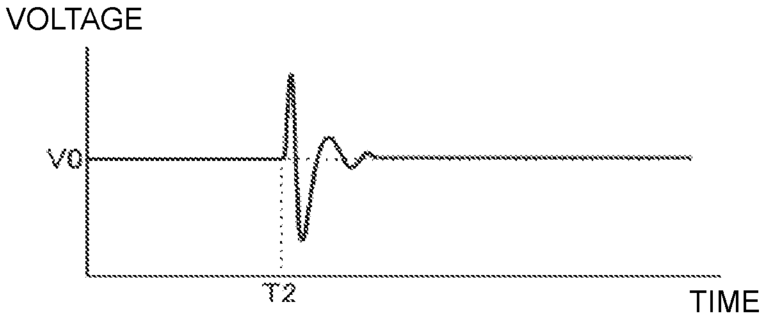
Figure 7C:
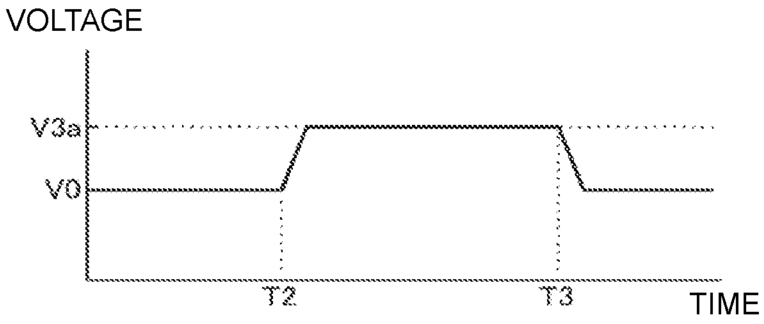

FIG. 7A is a drawing illustrative of a signal received by a latch circuit when no temporary short circuit is formed. FIG. 7B is a drawing illustrative of a signal received by the latch circuit when the temporary short circuit is formed. FIG. 7C is a drawing illustrative of a signal outputted from the latch circuit (third output part).

Figure 8A:
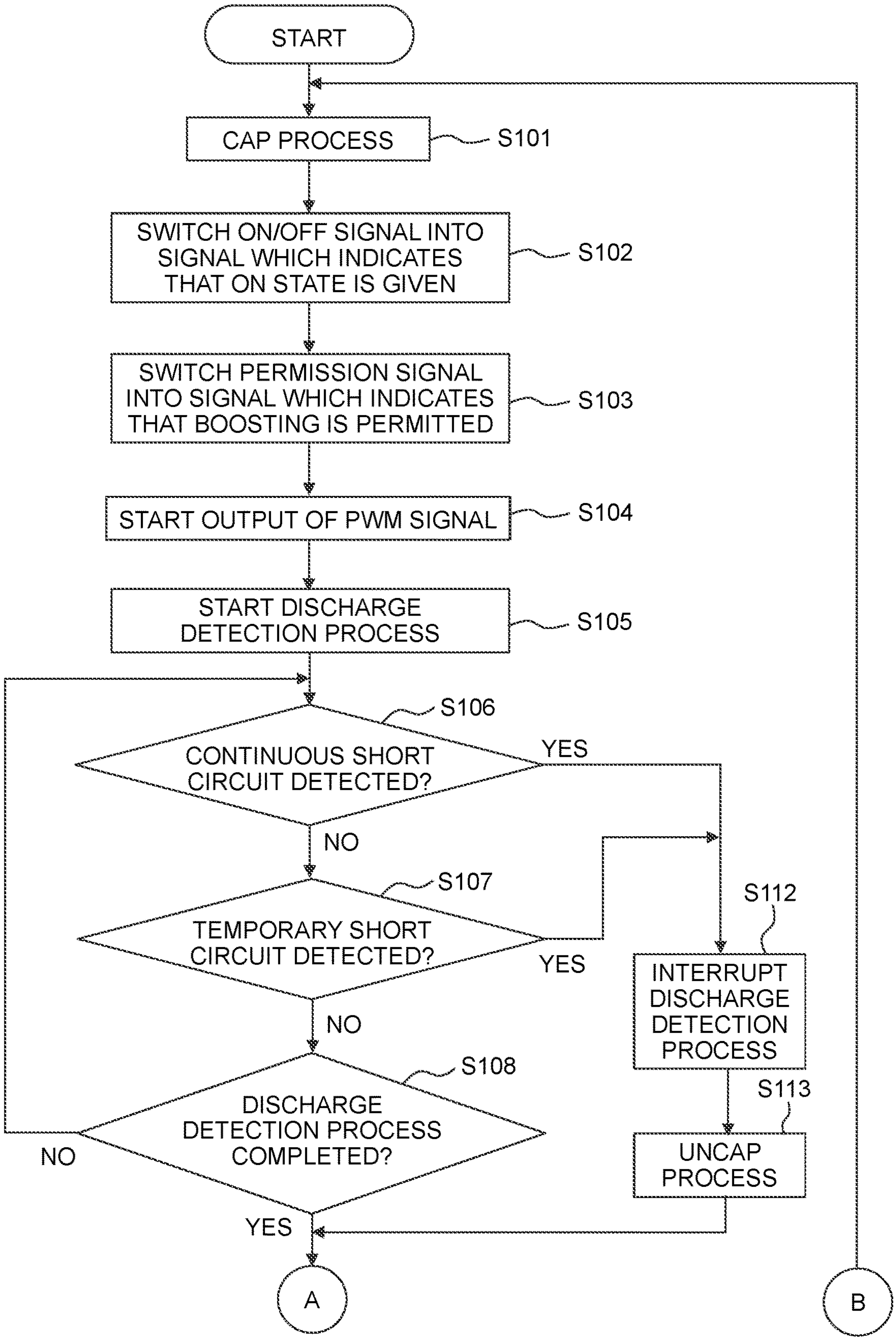
Figure 8B:
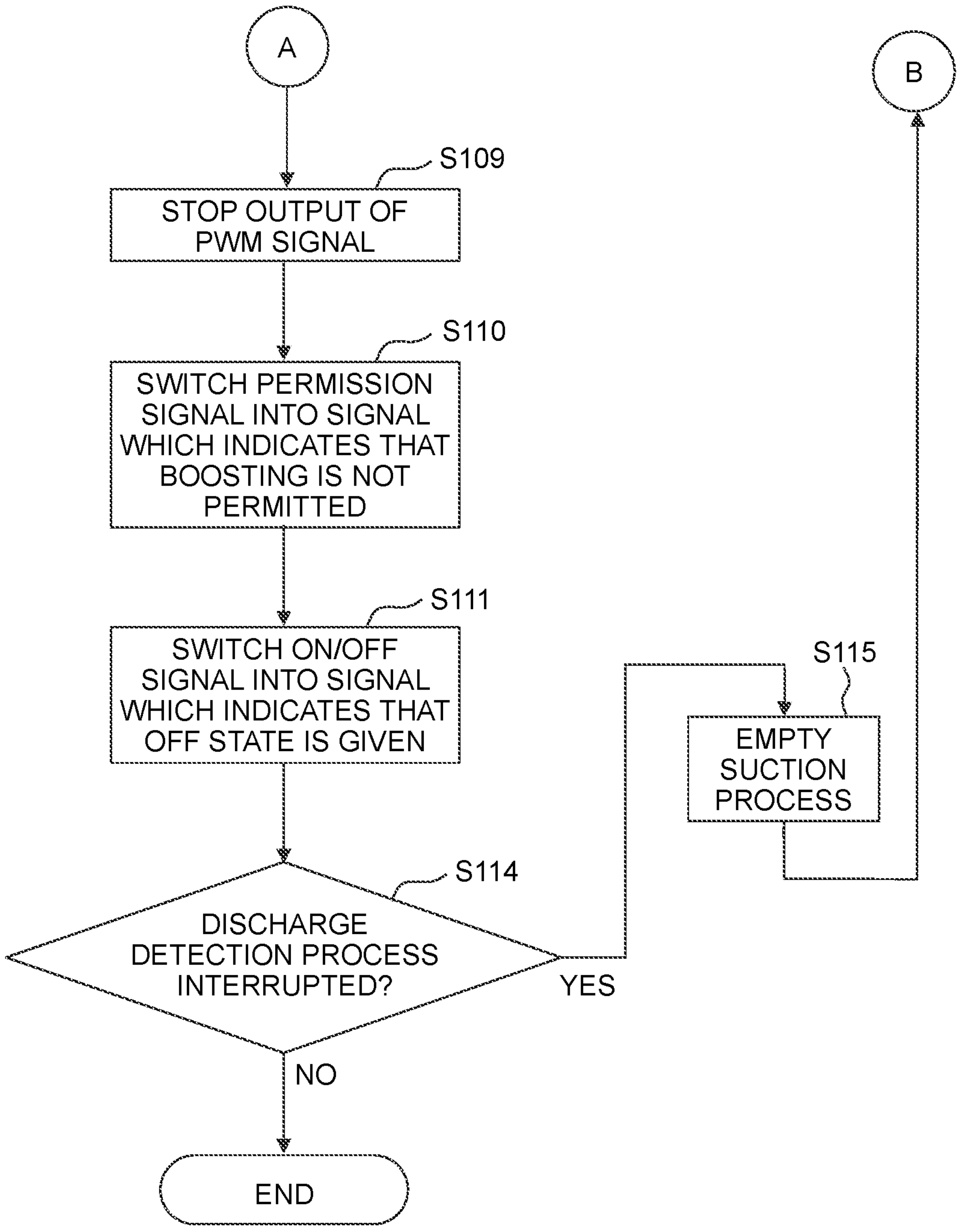

FIG. 8A and FIG. 8B are flow charts illustrative of a flow of a process when an inspection instruction signal is received.

Figure 9:
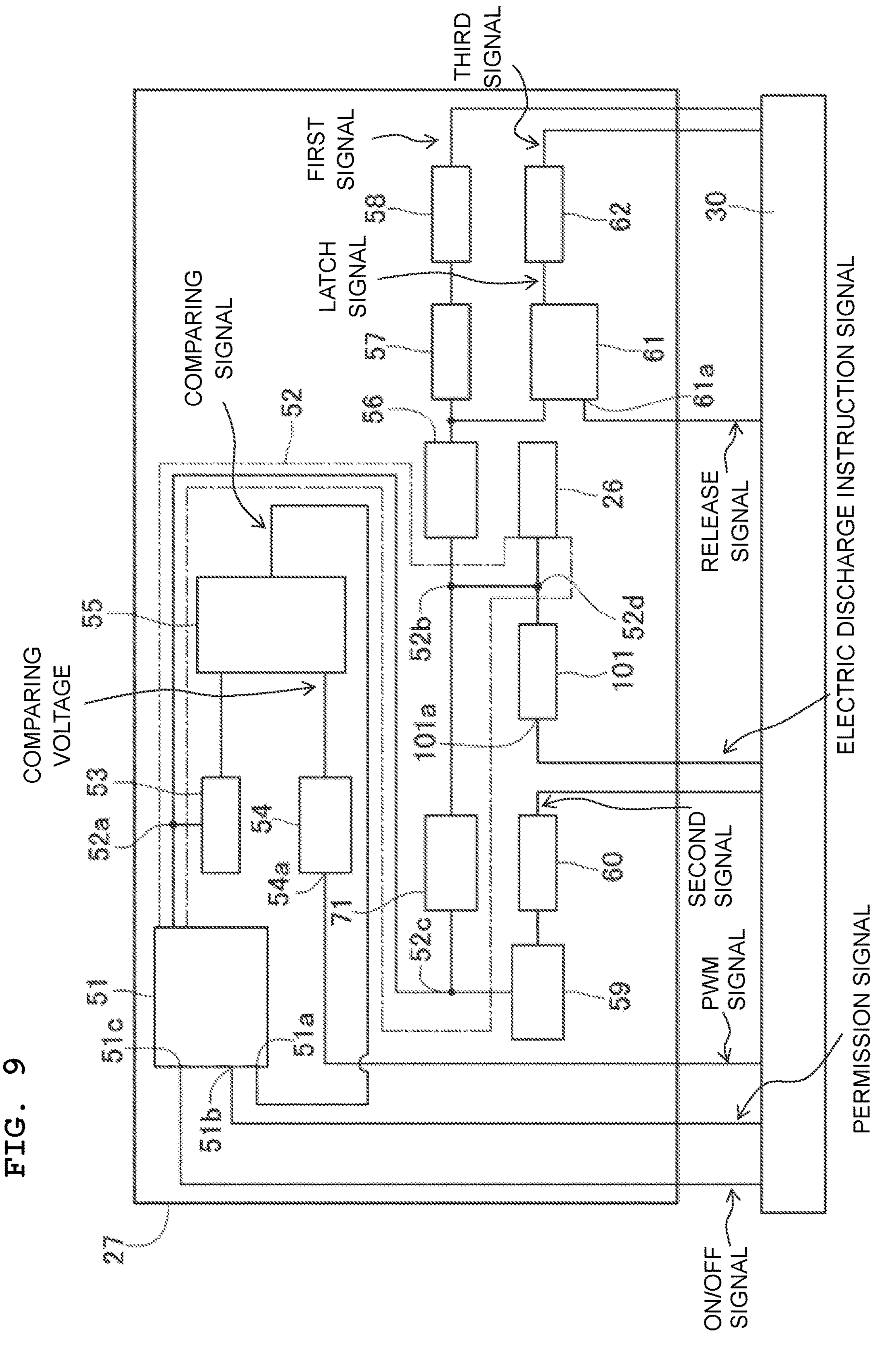

FIG. 9 is a block diagram illustrative of configuration of an inspection circuit of an example in which an electric discharge instruction signal is outputted from a controller to an electric discharge circuit.

Figure 10A:
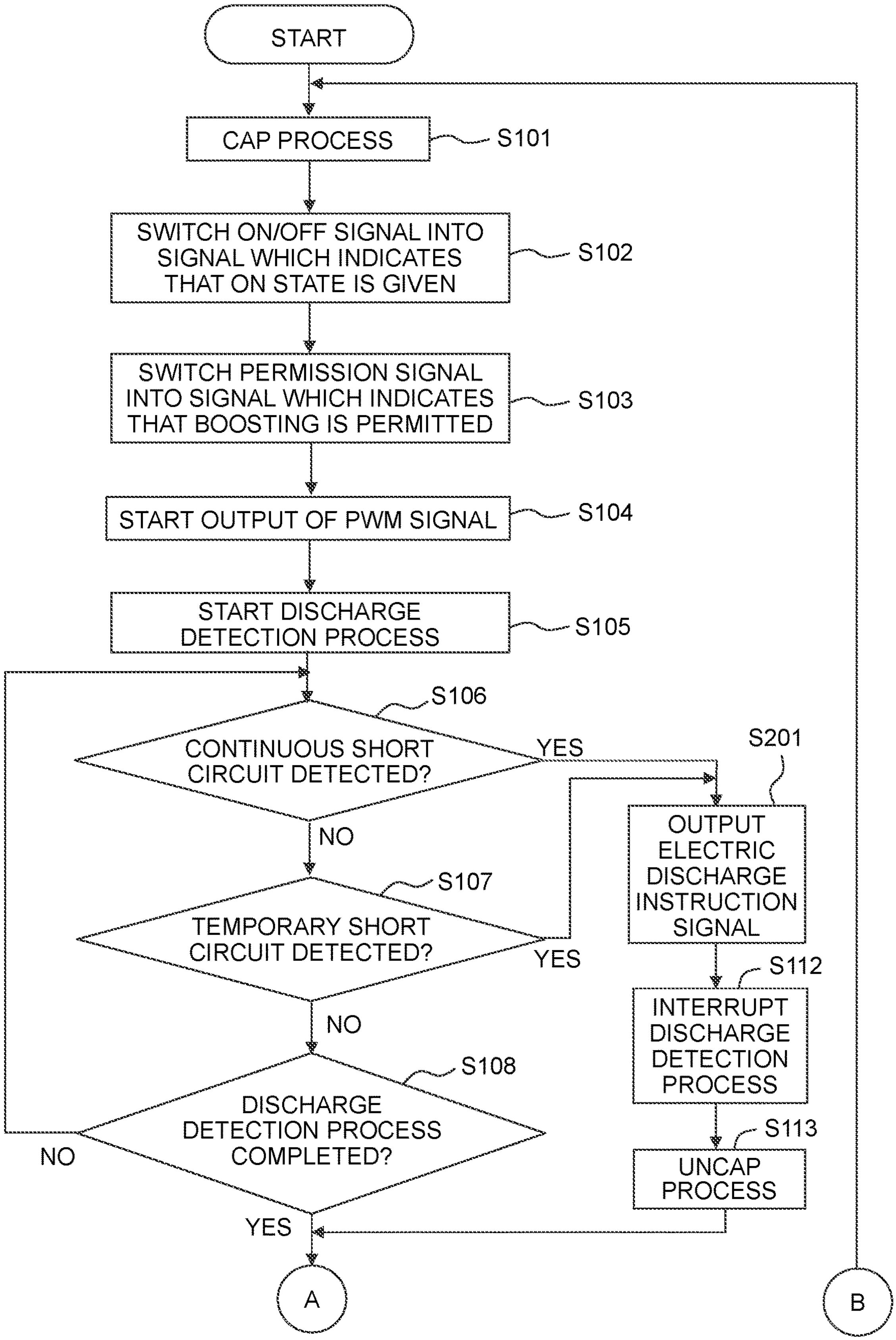
Figure 10B:
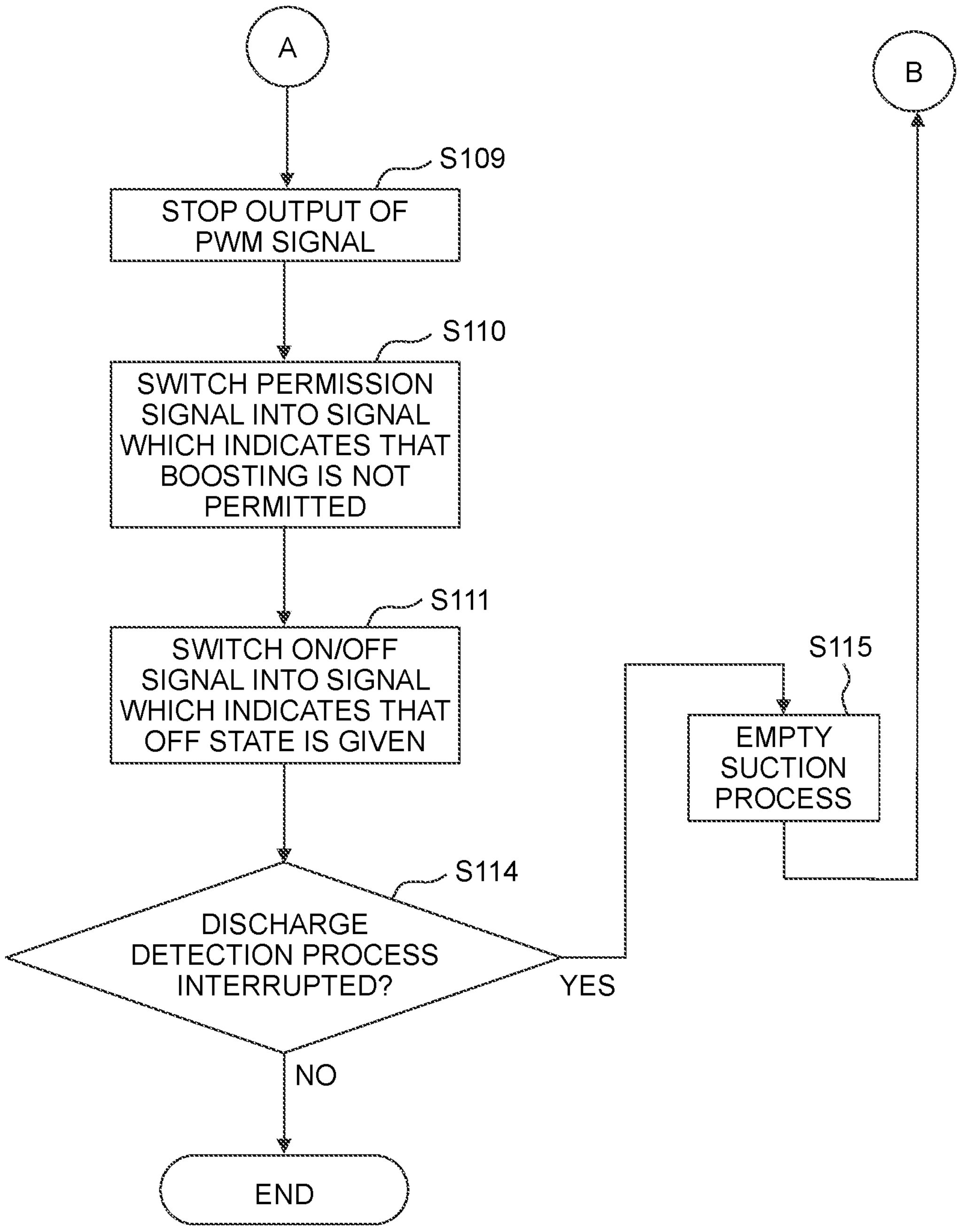

FIG. 10A and FIG. 10B are flow charts illustrative of a flow of a process when an inspection instruction signal is received in the example depicted in FIG. 9.

Figure 11:
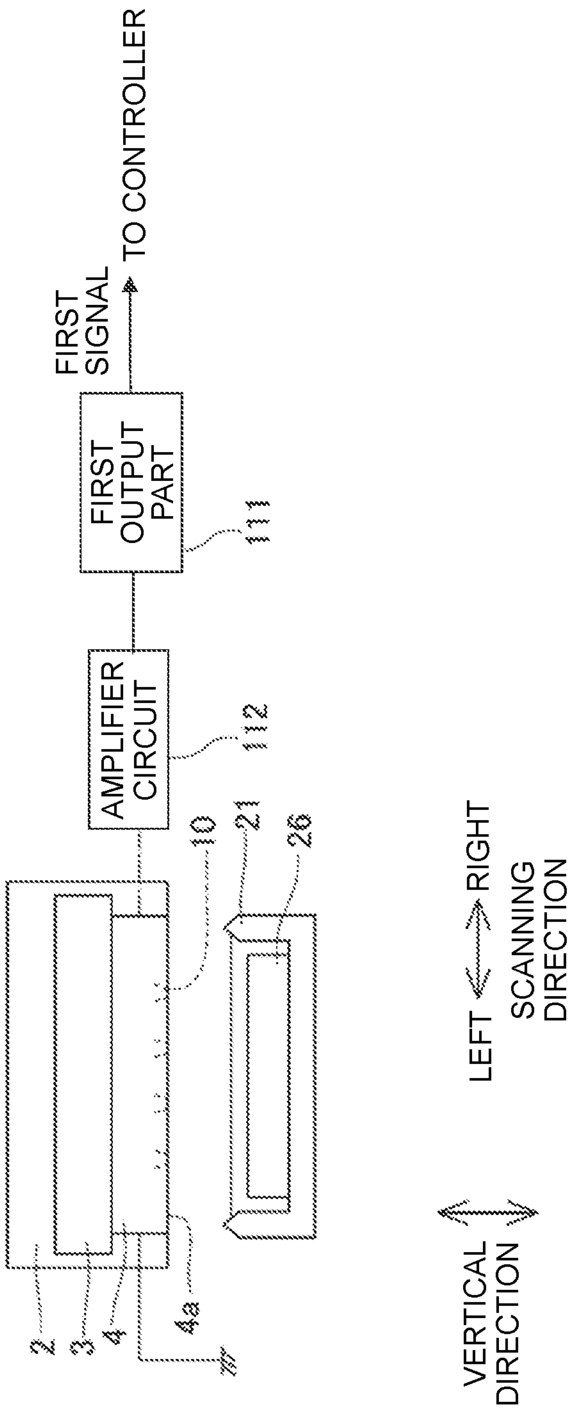

FIG. 11 is a drawing illustrative of an example in which an ink-jet head and a first output part are electrically connected.

An embodiment of the present disclosure will be explained below.

<Overall Configuration of Printer>

Figure 1:
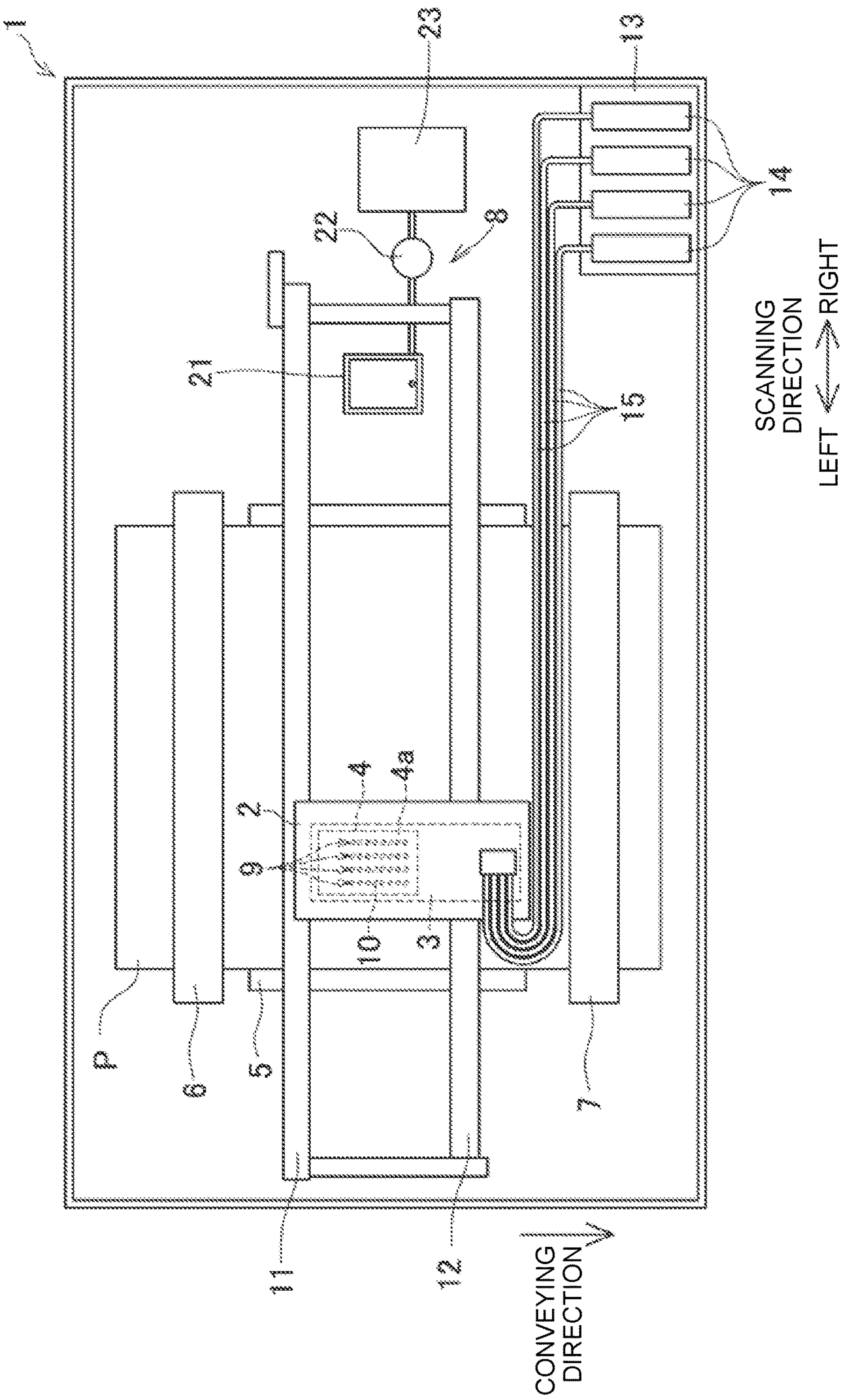
FIG. 1 is a schematic drawing illustrative of a printer.

As depicted in FIG. 1, a printer 1 (an example of the "liquid discharging apparatus" of an aspect of the invention) according to this embodiment includes, for example, a carriage 2, a subtank 3, an ink-jet head 4 (an example of the "liquid discharging head" of an aspect of the invention), a platen 5, conveying rollers 6, 7, and a maintenance unit 8.

The carriage 2 is supported by two guide rails 11, 12 which extend in the scanning direction. The carriage 2 is connected to a carriage motor 36 (see FIG. 3) by the aid of, for example, an undepicted belt. When the carriage motor 36 is driven, the carriage 2 is moved in the scanning direction along the guide rails 11, 12. Note that the following explanation will be made while defining the right and the left in the scanning direction as depicted in FIG. 1.

The subtank 3 is carried on the carriage 2. In this case, the printer 1 is provided with a cartridge holder 13. Four ink cartridges 14 are removably installed to the cartridge holder 13. The four ink cartridges 14 are aligned in the scanning direction. Black, yellow, cyan, and magenta inks (an example of the "liquids" of an aspect of the invention) are stored in the four ink cartridges 14, respectively, in this order from the rightmost ink cartridge 14 in the scanning direction. The subtank 3 is connected to the four ink cartridges 14 installed to the cartridge holder 13 via four tubes 15. Accordingly, the four color inks as described above are supplied from the four ink cartridges 14 to the subtank 3.

The ink-jet head 4 is carried on the carriage 2, and the ink-jet head 4 is connected to the lower end portion of the subtank 3. The four color inks as described above are supplied from the subtank 3 to the ink-jet head 4. Further, the ink-jet head 4 discharges the inks from a plurality of nozzles 10 which are formed on a nozzle surface 4*a* as the lower surface of the ink-jet head 4. This configuration will be explained in more detail below. The plurality of nozzles 10 are arranged in the conveying direction orthogonal to the scanning direction, and thus the plurality of nozzles 10 form nozzle arrays 9. The four nozzle arrays 9 are aligned in the scanning direction on the nozzle surface 4*a*. The black, yellow, cyan, and magenta inks are discharged from nozzles 10 of the four nozzle arrays 9, respectively, in this order from the rightmost nozzle array 9 in the scanning direction.

The platen 5 is arranged under or below the ink-jet head 4, and the platen 5 is opposed to the plurality of nozzles 10. The platen 5 extends over the entire length of the recording paper P in the scanning direction, and the platen 5 supports the recording paper P from the lower position. The conveying roller 6 is arranged on the upstream in the conveying direction from the ink-jet head 4 and the platen 5. The conveying roller 7 is arranged on the downstream in the conveying direction from the ink-jet head 4 and the platen 5. The conveying rollers 6, 7 are connected to a conveyance motor 37 (see FIG. 3), for example, via undepicted gears. When the conveyance motor 37 is driven, then the conveying rollers 6, 7 are rotated, and the recording paper P is conveyed in the conveying direction.

The maintenance unit 8 is provided with a cap 21, a suction pump 22, and a waste liquid tank 23. The cap 21 is arranged on the right in the scanning direction as compared with the platen 5. Then, when the carriage 2 is positioned at the maintenance position disposed on the right in the scanning direction as compared with the platen 5, the plurality of nozzles 10 face or are opposed to the cap 21.

Figure 3:
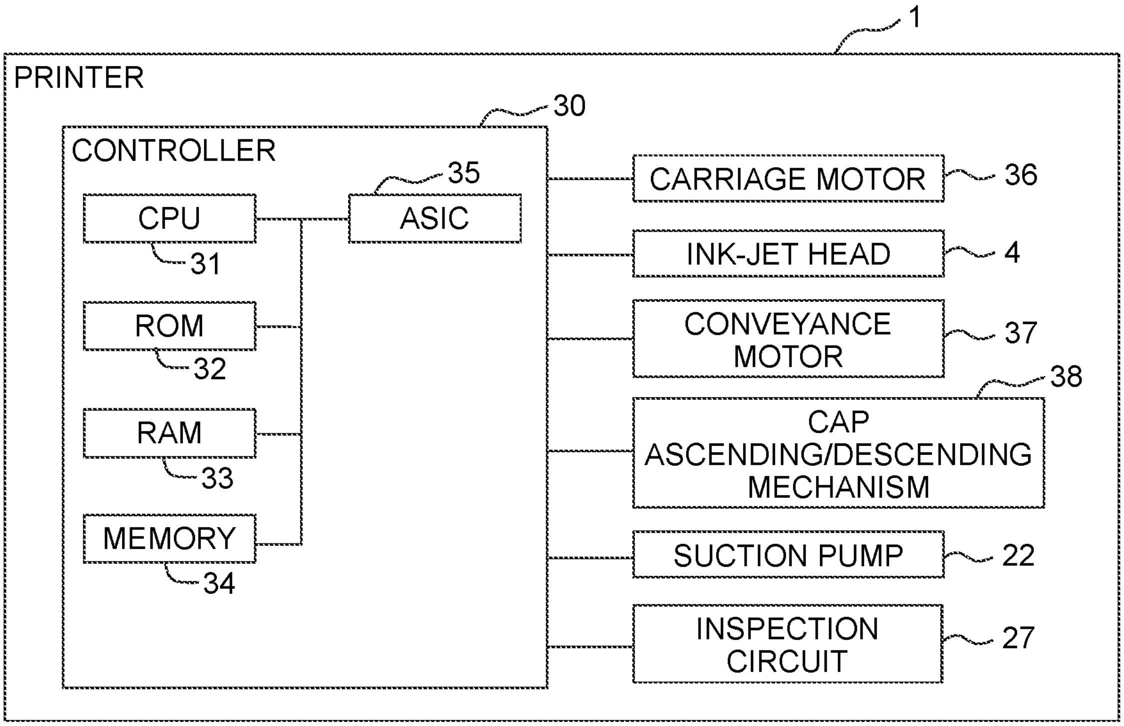
FIG. 3 is a block diagram illustrative of electric configuration of the printer.

Further, the cap 21 can ascend/descend by means of a cap ascending/descending mechanism 38 (see FIG. 3). Then, when the cap 21 is moved upwardly by means of the cap ascending/descending mechanism 38 in a state in which the plurality of nozzles 10 are opposed to the cap 21 by positioning the carriage 2 at the maintenance position described above, then the upper end portion of the can 21 is brought in tight contact with the nozzle surface 4*a*, and a capped state is given such that the plurality of nozzles 10 are covered with the cap 21. Further, in a state in which the cap 21 is moved downwardly by means of the cap ascending/descending mechanism 38, an uncap state is given such that the plurality of nozzles 10 are not covered with the cap 21. Note that the present disclosure is not limited to the configuration in which the cap 21 covers the plurality of nozzles 10 by making tight contact with the nozzle surface 4*a*. The cap 21 may cover the plurality of nozzles 10, for example, by making tight contact with an undepicted frame or the like which is arranged around the nozzle surface 4*a* of the ink-jet head 4.

The suction pump 22 is a tube pump or the like which is connected to the cap 21 and the waste liquid tank 23. Then, the maintenance unit 8 can perform the so-called suction purge in which the inks contained in the ink-jet head 4 are drained from the plurality of nozzles 10 when the suction pump 22 is driven in the capped state as described above. The inks, which are drained by the suction purge, are stored in the waste liquid tank 23.

Note that the explanation has been made in this section for the purpose of convenience assuming that the cap 21 collectively covers all of the nozzles 10 and the inks contained in the ink-jet head 4 are drained from all of the nozzles 10 in the suction purge. However, there is no limitation thereto. For example, the following configuration is also available. That is, the cap 21 is separately provided with a portion which covers the plurality of nozzles 10 for constructing the nozzle array 9 disposed on the rightmost for discharging the black ink, and a portion which covers the plurality of nozzles 10 for constructing the three nozzle arrays 9 disposed on the left for discharging the color inks (inks of yellow, cyan, and magenta). Any one of the black ink and the color inks contained in the ink-jet head 4 can be selectively drained in the suction purge. Alternatively, the following configuration is also available. That is, the caps 21 are individually provided for each of the nozzle arrays 9. The inks can be individually drained from the nozzles 10 of each of the nozzle arrays 9 in the suction purge.

Further, in the maintenance unit 8, it is possible to perform the so-called empty suction in which the inks, which are pooled in the cap 21, for example, on account of the suction purge and/or the inspection driving as described later on, are drained, when the suction pump 22 is driven in the uncap state. The inks, which are drained from the cap 21 by means of the empty suction, are also pooled in the waste liquid tank 23.

Figure 2:
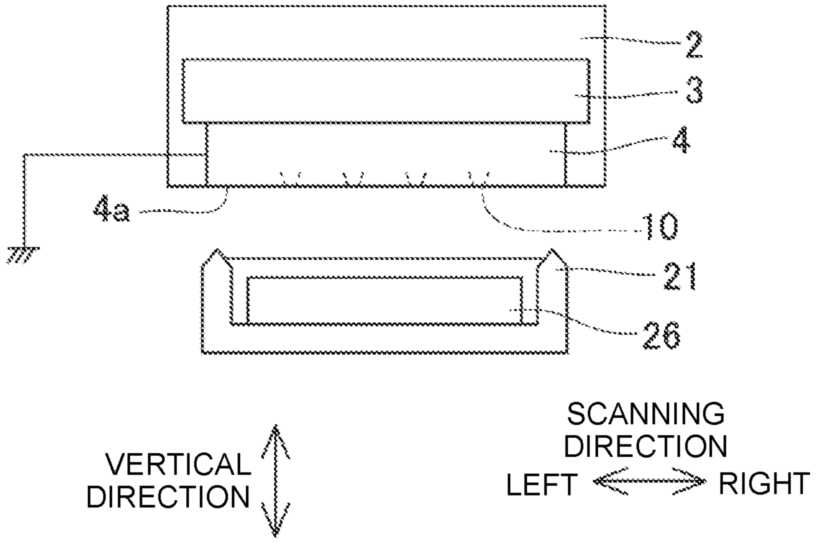
FIG. 2 is a drawing illustrative of, for example, an electrode arranged in a cap.

Further, as depicted in FIG. 2, an electrode 26, which has a rectangular planar shape, is arranged in the cap 21. The electrode 26 constitutes an inspection circuit (a circuit for inspection) 27 (see FIGS. 3 and 4) as described later on. The inspection circuit 27 is controlled by a controller 30 (see FIGS. 3 and 4). Then, in this embodiment, it is possible to determine whether or not the inks are discharged from the nozzles 10 on the basis of the change of the voltage of the electrode 26 provided when the ink-jet head 4 is allowed to perform the inspection driving (driving for inspection) for discharging the inks from the nozzles 10 in a state in which the capped state as described above is given and the electric potential difference is generated between the ink-jet head 4 and the electrode 26 as described later on.

<Electric Configuration of Printer>

Next, the electric configuration of the printer 1 will be explained. As depicted in FIG. 3, the printer 1 is provided with the controller 30. The controller 30 is composed of, for example, CPU (Central Processing Unit) 31, ROM (Read Only Memory) 32, RAM (Random Access Memory) 33, a memory 34, and ASIC (Application Specific Integrated Circuit) 35. The controller 30 controls the operations of, for example, the carriage motor 36, the ink-jet head 4, the conveyance motor 37, the cap ascending/descending mechanism 38, the suction pump 22, and the inspection circuit 27. Further, the controller 30 receives the signal from the inspection circuit 27.

Note that as for the controller 30, only CPU 31 may perform various processings, only ASIC 35 may perform various processings, or CPU 31 and ASIC 35 may perform various processings in a cooperated manner. Further, as for the controller 30, one CPU 31 may perform the processing alone, or a plurality of CPU's 31 may perform the processing in a shared manner. Further, as for the controller 30, one ASIC 35 may perform the processing alone, or a plurality of ASIC's 35 may perform the processing in a shared manner.

<Inspection Circuit>

Figure 4:
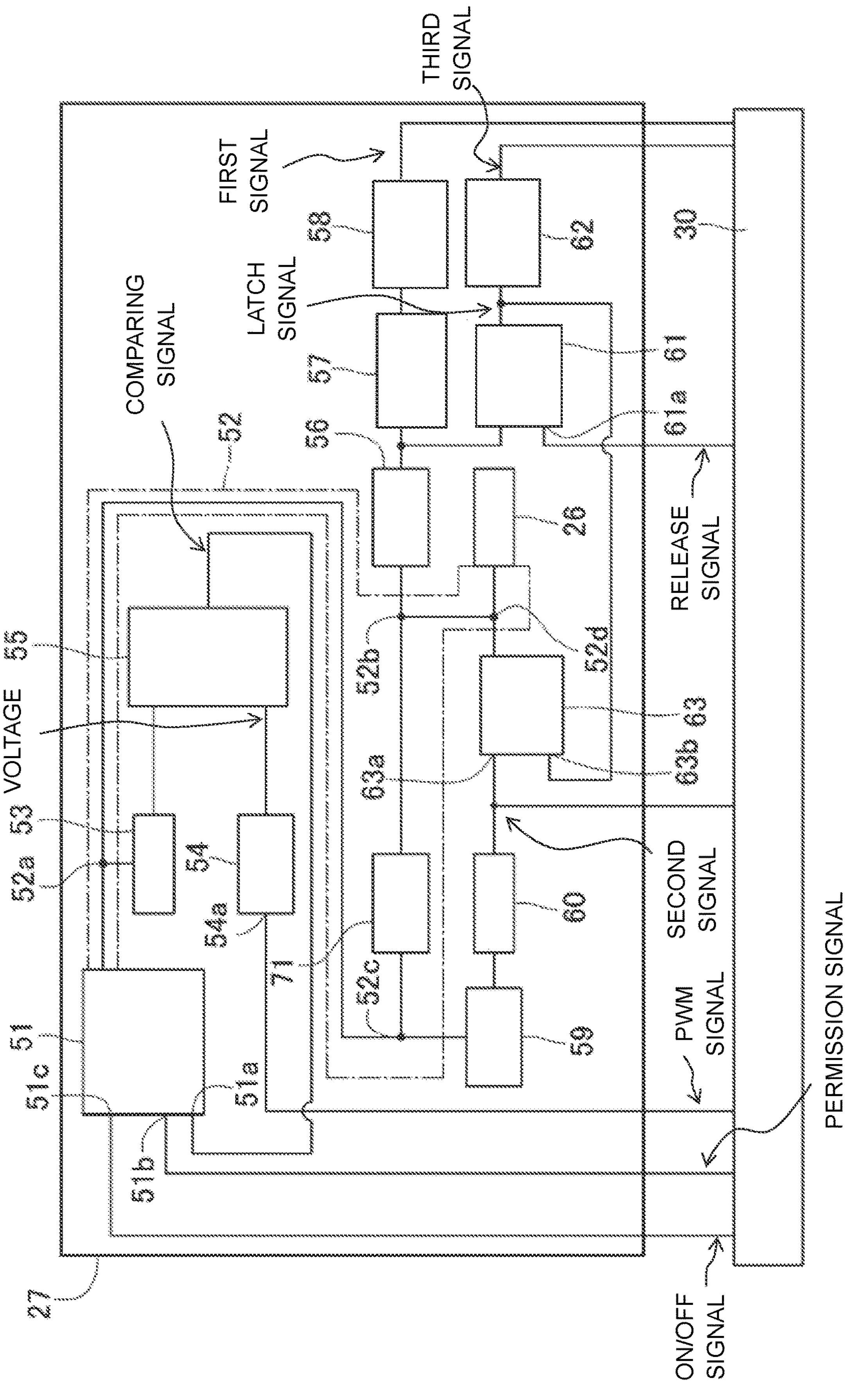
FIG. 4 is a block diagram illustrative of configuration of an inspection circuit.

Next, the inspection circuit (circuit for inspection) 27 will be explained. As depicted in FIG. 4, the inspection circuit 27 comprises the electrode 26 described above, a voltage supply circuit 51 (an example of the "voltage supplier" of an aspect of the invention), a main circuit 52, a voltage division circuit 53, a comparing voltage generating circuit 54, a comparing circuit 55, a high pass filter 56, an amplifier circuit 57, a first output part 58, a low pass filter 59 (an example of the "second low pass filter" of an aspect of the invention), a second output part 60, a latch circuit 61, a third output part 62, and an electric discharge circuit 63 (an example of the "electric discharger" of an aspect of the invention).

The voltage supply circuit 51 is provided to generate the electric potential difference between the ink-jet head 4 and the electrode 26 by applying the voltage to the electrode 26. The voltage supply circuit 51 adjusts the voltage to be outputted by switching the execution of the boosting to raise the voltage to be outputted and the stop of the boosting as described later on. The operation of the voltage supply circuit 51 will be explained in detail later on.

Further, the voltage supply circuit 51 has a comparing signal receiving part 51*a*, a permission signal receiving part 51*b*, and an ON/OFF signal receiving part 51*c*.

The comparing signal receiving part 51*a* is the portion which receives the comparing signal outputted from the comparing circuit 55 as described later on. The permission signal receiving part 51*b* is the portion which receives the permission signal outputted from the controller 30. The permission signal is the signal which indicates whether or not the execution of the boosting is permitted in the voltage supply circuit 51. The ON/OFF signal receiving part 51*c* is the portion which receives the ON/OFF signal outputted from the controller 30. The ON/OFF signal is the signal which indicates that the voltage supply circuit 51 is to be either an ON state or an OFF state, the ON state being a state in which the voltage supply circuit 51 is capable of executing the boosting, the OFF state being a state in which the voltage supply circuit 51 is incapable of executing the boosting.

The main circuit 52 is the circuit which connects the voltage supply circuit 51 and the electrode 26. A low pass filter 71 is connected to the portion of the main circuit 52 disposed between the voltage supply circuit 51 and the electrode 26. The low pass filter 71 is the filter which gradually diminishes the component of the frequency higher than the cutoff frequency in the voltage fluctuation on the voltage supply circuit 51 side of the main circuit 52 being upstream of the voltage supply from the low pass filter 71 with respect to the electrode 26 side of the main circuit 52 being downstream of the voltage supply from the low pass filter 71. That is, the DC component of the voltage inputted from the downstream of the voltage supply is mainly outputted to the upstream of the voltage supply via the low pass filter 71.

The voltage division circuit 53 is connected to the junction 52*a* of the main circuit 52 disposed between the voltage supply circuit 51 and the low pass filter 71. The voltage division circuit 53 outputs the voltage Vd obtained by dividing, at a predetermined ratio, the voltage V outputted from the voltage supply circuit 51. The voltage Vd, which is outputted from the voltage division circuit 53, is the voltage which has the magnitude capable of being inputted into the comparing circuit 55.

The comparing voltage generating circuit 54 generates the comparing voltage Vda which is provided to be compared with the voltage Vd outputted from the voltage division circuit 53. The comparing voltage Vda is the voltage which corresponds to the predetermined voltage Va. In particular, the magnitude |Vda| of the comparing voltage Vda is the magnitude |VO| of the voltage Vd outputted from the voltage division circuit 53 when the magnitude |V| of the voltage V outputted from the voltage supply circuit 51 is the magnitude |Va| of the predetermined voltage Va. In other words, the magnitude |Vda| of the comparing voltage Vda is set so that the magnitude |V| of the voltage V outputted from the voltage supply circuit 51 is the magnitude |Va| of the predetermined voltage Va. The comparing voltage generating circuit 54 has a PWM signal receiving part 54*a* which receives the PWM (Pulse Width Modulation) signal outputted from the controller 30. The comparing voltage generating circuit 54 generates the comparing voltage on the basis of the PWM signal received by the PWM signal receiving part 54*a*. Specifically, the comparing voltage generating circuit 54 generates the comparing voltage Vda which has a larger magnitude when the rate R of High for the value of the PWM signal is higher.

The comparing circuit 55 is electrically connected to the voltage division circuit 53, the comparing voltage generating circuit 54, and the voltage supply circuit 51. The comparing circuit 55 compares the magnitude |VO| of the voltage Vd outputted from the voltage division circuit 53 with the magnitude |Vda| of the comparing voltage Vda outputted from the comparing voltage generating circuit 54, and the comparing circuit 55 outputs a comparing signal corresponding to the obtained result to the voltage supply circuit 51. That is, the comparing signal is the signal which indicates whether or not the magnitude |VO| of the voltage Vd outputted from the voltage division circuit 53 is larger than the magnitude |Vda| of the comparing voltage Vda. The comparing signal, which is outputted from the comparing circuit 55, is received by the comparing signal receiving part 51*a* of the voltage supply circuit 51.

An explanation will now be made about the operation of the voltage supply circuit 51. If the permission signal, which is received by the permission signal receiving part 51*b*, indicates that the execution of the boosting in the voltage supply circuit 51 is permitted, and if the ON/OFF signal, which is received by the ON/OFF signal receiving part 51*c*, indicates that the voltage supply circuit 51 is to be in the ON state, then the voltage supply circuit 51 switches the execution of the boosting and the stop of the boosting, on the basis of the comparing signal. Specifically, the voltage supply circuit 51 performs the boosting if the comparing signal indicates that |Vd| is not more than |Vda|. On the other hand, if the comparing signal indicates that |Vd| is larger than |Vda|, the voltage supply circuit 51 stops the boosting. Accordingly, the magnitude |Vd| of the voltage Vd outputted from the voltage division circuit 53 is retained to be the magnitude |Vda| of the comparing voltage Vda. Then, the magnitude |V| of the voltage V outputted from the voltage supply circuit 51 is retained to be the magnitude |Va| of the predetermined voltage Va.

In this context, the predetermined voltage Va is the positive voltage of, for example, about 500 V. The comparing voltage Vda is the positive voltage of, for example, about 1.7 V. In this case, the voltages V, Vd are the voltages which are not less than 0 V. Alternatively, the predetermined voltage Va may be the negative voltage of, for example, about −500 V. The comparing voltage Vda may be the negative voltage of, for example, about −1.7 V. In this case, the voltages V, Vd are the voltages which are not more than 0 V.

The high pass filter 56 is connected to a junction 52*b* (an example of the "second junction" of an aspect of an invention) of the main circuit 52 disposed between the electrode 26 and the low pass filter 71. The amplifier circuit 57 is connected to the high pass filter 56. The first output part 58 is connected to the amplifier circuit 57. That is, the amplifier circuit 57 is connected between the high pass filter 56 and the first output part 58. Further, the high pass filter 56 is connected between the voltage supply circuit 51 and the first output part 58.

If the voltage fluctuation occurs at the electrode 26 disposed on the upstream of the voltage supply from the high pass filter 56, the DC component of the voltage (high voltage component applied by the voltage supply circuit 51) is removed by the high pass filter 56 so that the DC component is not transmitted to the downstream of the voltage supply from the high pass filter 56. The voltage, which passes through the high pass filter 56, is amplified by the amplifier circuit 57, and the voltage is outputted from the first output part 58. Accordingly, the signal, which is outputted from the first output part 58, is the signal in which the high frequency component of the voltage of the electrode 26 is amplified.

Here, an explanation will be made about the voltage of the electrode 26 provided when the inspection driving is performed in order to allow the ink-jet head 4 to discharge the inks from the nozzles 10 in a state in which the capped state as described above is given and the electric potential difference is generated between the ink-jet head 4 and the electrode 26 by applying the voltage to the electrode 26 by means of the voltage supply circuit 51. If the ink is not discharged from the nozzle 10 in accordance with the inspection driving, the voltage of the electrode 26 is scarcely changed. If the ink is discharged from the nozzle 10 in accordance with the inspection driving, the voltage of the electrode 26 is changed. Further, in this situation, the sudden change of the voltage of the electrode 26 is brought about. Therefore, the high frequency component of the voltage of the electrode 26 differs depending on whether or not the ink is discharged from the nozzle 10 in accordance with the inspection driving.

Accordingly, if the ink is not discharged from the nozzle 10 in accordance with the inspection driving, each of the signal outputted from the high pass filter 56 to the amplifier circuit 57 and the signal outputted from the first output part 58 is the signal in which the voltage scarcely changes from V0 as depicted in FIG. 5A. In this case, V0 is, for example, the voltage which is approximate to the ground electric potential.

On the other hand, if the ink is discharged from the nozzle 10 in accordance with the inspection driving, and the voltage of the electrode 26 is changed, then the signal, which is outputted from the high pass filter 56 to the amplifier circuit 57, is the signal in which the voltage is changed with respect to V0 as depicted in FIG. 5B. However, the amount of change of the voltage of the electrode 26, which is provided when the ink is discharged from the nozzle 10 in accordance with the inspection driving, is smaller than the amount of change of the voltage of the electrode 26 which is provided when the temporary short circuit is formed between the ink-jet head 4 and the electrode 26 as described later on. On this account, the signal, which is outputted from the high pass filter 56 to the amplifier circuit 57 when the ink is discharged from the nozzle 10 in accordance with the inspection driving, is also the signal in which the amount of change of the voltage is small as depicted in FIG. 5B.

Further, the signal, which is outputted from the first output part 58, is the signal which is obtained by amplifying the signal depicted in FIG. 5B as depicted in FIG. 5C. Therefore, the signal, which is outputted from the first output part 58, has the large voltage change as compared with the signal which is outputted from the high pass filter 56 to the amplifier circuit 57. Specifically, the signal, which is outputted from the first output part 58 when the ink is discharged from the nozzle 10 in accordance with the inspection driving, is the signal in which the maximum value Vh of the voltage V1 is larger than Vh1 (>V0), and the minimum value Vm of the voltage V1 is smaller than Vm1 (<V0).

As described above, the signal, which is outputted from the first output part 58, is the signal which indicates whether or not the ink is discharged from the nozzle 10 in accordance with the inspection driving. Further, the signal, which is outputted from the first output part 58, is the signal which is amplified by the amplifier circuit 57. Therefore, as for this signal, the amount of change of the voltage, which is provided when the ink is discharged from the nozzle 10 in accordance with the inspection driving, is large to some extent.

The low pass filter 59 is connected to a junction 52*c* (an example of the "first junction" of an aspect of the invention) of the main circuit 52 disposed between the voltage supply circuit 51 and the low pass filter 71. In this case, the junction 52*c* is also the portion of the main circuit 52 disposed between the voltage supply circuit 51 and the electrode 26. The second output part 60 is connected to the low pass filter 59. Accordingly, this embodiment is configured such that the second output part 60 is connected to the junction 52*c*, and the low pass filter 59 is connected between the junction 52*c* and the second output part 60.

The second signal, which is outputted from the second output part 60, is the signal from which the high frequency component is removed by the low pass filters 59, 71 with respect to the fluctuation of the voltage of the electrode 26. That is, the second signal, which is outputted from the second output part 60, is principally the signal of the DC component of the voltage of the electrode 26.

In this context, for example, the continuous short circuit is formed in some cases between the ink-jet head 4 and the electrode 26 on account of the connection between the ink-jet head 4 and the electrode 26 via the ink contained in the cap 21. The formation of the continuous short circuit between the ink-jet head 4 and the electrode 26 means that the state, in which the ink-jet head 4 and the electrode 26 form the short circuit, continues, and the leak current continuously flows between the ink-jet head 4 and the electrode 26. If the continuous short circuit is formed between the ink-jet head 4 and the electrode 26, the magnitude of the voltage of the electrode 26 is decreased on account of the continuous flow of the leak current between the ink-jet head 4 and the electrode 26.

On this account, as depicted in FIG. 6, the magnitude |V2| of the voltage V2 of the second signal outputted from the second output part 60 is approximately that of the voltage V2*a* (V2*a*>0) in the state in which the continuous short circuit is not formed between the ink-jet head 4 and the electrode 26. The magnitude |V2| of the voltage V2 of the second signal outputted from the second output part 60 is smaller than that of the voltage V2*b* (<V2*a*) in the state in which the continuous short circuit is formed between the ink-jet head 4 and the electrode 26. Accordingly, the second signal is the signal which indicates whether or not the continuous short circuit is formed between the ink-jet head 4 and the electrode 26. Note that FIG. 6 depicts such a case that the continuous short circuit is not formed between the ink-jet head 4 and the electrode 26 until the time T1, and the continuous short circuit is formed between the ink-jet head 4 and the electrode 26 after the time T1.

The latch circuit 61 is connected to the high pass filter 56 in parallel to the amplifier circuit 57. The third output part 62 is connected to the latch circuit 61. Accordingly, in this configuration, the third output part 62 is connected to the high pass filter 56 without allowing the amplifier circuit 57 to intervene therebetween, and the latch circuit 61 is connected between the high pass filter 56 and the third output part 62. The latch circuit 61 receives the signal in which the DC component (high voltage component applied by the voltage supply circuit 51) is removed from the voltage of the electrode 26 by the high pass filter 56. The latch circuit 61 is configured such that the signal is outputted from the latch circuit 61 if the voltage of not less than a predetermined voltage is inputted to the latch circuit 61, and the signal is not outputted from the latch circuit 61 if the voltage of less than the predetermined voltage is inputted to the latch circuit 61. Further, the latch circuit 61 has a circuit which maintains the output if the signal is once outputted from the latch circuit 61. The latch circuit 61 is provided with a release signal receiving part 61*a* for receiving, from the controller 30, a release signal which instructs the release of the output. The maintenance of the output of the latch circuit 61 is continued until the latch circuit 61 receives the release command from the controller 30.

In this context, for example, if the temporary short circuit is formed between the ink-jet head 4 and the electrode 26, for example, on account of any temporary occurrence of the electric discharge at the gap between the nozzle surface 4*a* and the ink contained in the cap 21, any temporary voltage change arises in the electrode 26. The formation of the temporary short circuit between the ink-jet head 4 and the electrode 26 means that the ink-jet head 4 and the electrode 26 temporarily form the short circuit, and the leak current temporarily flows between the ink-jet head 4 and the electrode 26. Further, the sudden temporary voltage change arises in the electrode 26 when the temporary short circuit is formed between the ink jet head 4 and the electrode 26. On this account, the high frequency component of the voltage of the electrode 26 differs depending on whether or not the temporary short circuit is formed between the ink-jet head 4 and the electrode 26. Further, the amount of change of the voltage of the electrode 26, which is provided in this situation, is larger than the amount of change of the voltage of the electrode 26 which is provided when the ink is discharged from the nozzle 10 in accordance with the inspection driving.

Therefore, if the temporary short circuit is not formed between the ink-jet head 4 and the electrode 26, as depicted in FIG. 7A, the voltage scarcely changes in the signal which is outputted from the high pass filter 56 and which is received by the latch circuit 61. In other words, the latch circuit 61 does not output any signal. On the other hand, if the temporary short circuit is formed between the ink-jet head 4 and the electrode 26, as depicted in FIG. 7B, the voltage temporarily changes in the signal which is received by the latch circuit 61. However, the change of the voltage occurs in a short period of time.

Then, if the voltage change, which is caused by the formation of the temporary short circuit between the ink-jet head 4 and the electrode 26, occurs in the signal received by the latch circuit 61, the latch circuit 61 outputs the signal. Further, the latch circuit 61 has the circuit to maintain the output, and hence the signal is continuously outputted. Accordingly, for example, as depicted in FIG. 7C, the latch signal is outputted from the latch circuit 61 as follows. That is, if the temporary short circuit is not formed between the ink-jet head 4 and the electrode 26, the signal has the voltage of V0. If the temporary short circuit is formed between the ink-jet head 4 and the electrode 26, the signal has the voltage of V3*a* (>V0). The output of the signal is maintained. That is, the latch signal, which is outputted from the latch circuit 61, is the signal which indicates whether or not the temporary short circuit is formed between the ink-jet head 4 and the electrode 26. Note that FIG. 7B and FIG. 7C depict the case in which the temporary short circuit is formed between the ink-jet head 4 and the electrode 26 at the time T2. Further, if the temporary short circuit is continuously formed between the ink-jet head 4 and the electrode 26, the latch signal, which is outputted from the latch circuit 61, continues the state in which the voltage is V3*a*. If it is determined that it is unnecessary to maintain the output from the latch circuit 61, the controller 30 outputs the release signal. The latch circuit 61 receives the release signal from the controller 30 at the release signal receiving part 61*a*. If the release signal is received, the latch circuit 61 stops the output of the latch signal. Note that FIG. 7C depicts the case in which the latch circuit 61 receives the release signal at the time T3 after the time T2. Further, the third signal, which is outputted from the third output part 62 connected to the latch circuit 61, is the same signal as the latch signal.

The electric discharge circuit 63 is connected to a junction 52*d* (an example of the "third junction" of an aspect of the invention) of the main circuit 52 disposed between the electrode 26 and the junction 52*b*. The junction 52*d* is also the portion of the main circuit 52 disposed between the electrode 26 and the low pass filter 71. Further, the junction 52*d* is disposed nearer to the electrode 26 as compared with the junction 52*c* of the main circuit 52 to which the second output part 60 is connected and the junction 52*b* to which the third output part 62 is connected. The electric discharge circuit 63 performs the electric discharge at the position near to the electrode 26 in order to quickly decrease the voltage of the electrode 26 without waiting for the decrease in the voltage supplied from the voltage supply circuit 51.

The electric discharge circuit 63 has a second signal receiving part 63*a* which receives the second signal outputted from the second output part 60, and a latch signal receiving part 63*b* which receives the signal outputted from the latch circuit 61. The second signal receiving part 63*a* is electrically connected to the second output part 60. Further, the latch signal receiving part 63*b* is electrically connected to the latch circuit 61. If the second signal, which is received by the second signal receiving part 63*a*, indicates that the continuous short circuit is formed between the ink-jet head 4 and the electrode 26, the electric discharge circuit 63 performs the electric discharge from the electrode 26. Further, if the latch signal, which is received by the latch signal receiving part 63*b*, indicates that the temporary short circuit is formed between the ink-jet head 4 and the electrode 26, the electric discharge circuit 63 also performs the electric discharge from the electrode 26.

<Process Upon Reception of Inspection Instruction Signal>

Next, an explanation will be made about the flow of the process of the controller 30 upon the reception of the inspection instruction signal to instruct the controller 30 to inspect whether or not the inks are discharged from the nozzles 10. In this embodiment, for example, if the user operates, for example, an undepicted operation unit of the printer 1 or PC or the like connected to the printer, and the user instructs the controller 30 to inspect whether or not the inks are normally discharged from the nozzles 10, then the inspection instruction signal is sent from the operation unit of the printer 1 or PC or the like, and the controller 30 receives the inspection instruction signal. Then, if the inspection instruction signal is received, the controller 30 performs the process in accordance with the flow depicted in FIGS. 8A and 8B.

Note that at the point in time at which the flow depicted in FIGS. 8A and 8B is started, the ON/OFF signal, which is outputted from the controller 30, indicates that the voltage supply circuit 51 is to be in the OFF state. Further, the permission signal, which is outputted from the controller 30, indicates that the execution of the boosting in the voltage supply circuit 51 is not permitted. Further, at this point in time, the controller 30 does not output the PWM signal.

The flow depicted in FIGS. 8A and 8B will be explained in more detail below. At first, the controller 30 executes the cap process (S101). In the cap process, the controller 30 controls the carriage motor 36 and the cap ascending/descending mechanism 38 to provide the capped state as described above. Note that if the capped state is given at the point in time at which the inspection instruction signal is received, the capped state is maintained in S101.

Subsequently, the controller 30 switches the ON/OFF signal into the signal which indicates that the voltage supply circuit 51 is to be in the ON state (S102). Subsequently, the controller 30 switches the permission signal into the signal which indicates that the boosting is permitted (S103). Subsequently, the controller 30 starts the output of the PWM signal (S104). In accordance with the processes of S102 to S104, the voltage supply circuit 51 switches the execution of the boosting and the stop of the boosting on the basis of the comparing signal as described above.

Accordingly, the boosting is performed in the voltage supply circuit 51 until the magnitude $|Vd|$ of the voltage Vd outputted from the voltage division circuit 53 becomes the magnitude $|Vda|$ of the comparing voltage Vda, i.e., until the magnitude $|V|$ of the voltage V outputted from the voltage supply circuit 51 becomes the magnitude $|Va|$ of the of the predetermined voltage Va. Then, the comparing signal, which is provided in accordance with the arrival of the magnitude $|Vd|$ of the voltage Vd outputted from the voltage division circuit 53 at the magnitude $|Vda|$ of the comparing voltage Vda, is received, and the boosting is stopped in the voltage supply circuit 51. As described above, the voltage supply circuit 51 repeats the boosting and the stop of the boosting on the basis of the comparing signal so that the magnitude $|Vd|$ of the voltage Vd outputted from the voltage division circuit 53 is retained at the magnitude $|Vda|$ of the comparing voltage Vda. That is, the magnitude $|V|$ of the voltage V outputted from the voltage supply circuit 51 is retained at the magnitude $|Va|$ of the predetermined voltage Va.

Subsequently, the controller 30 starts the discharging detection process after the voltage supplied to the electrode 26 becomes the predetermined voltage Va (S105). In the discharging detection process, the controller 30 successively allows the plurality of nozzles 10 of the ink-jet head 4 to perform the inspection driving respectively. Then, it is determined for each of the nozzles 10 whether or not the ink is normally discharged from the nozzle 10 on the basis of the first signal outputted from the first output part 58 when the inspection driving is performed. An obtained result is stored in the memory 34.

If the continuous short circuit is not formed between the ink-jet head 4 and the electrode 26 (S106: NO), and the temporary short circuit is not formed between the ink-jet head 4 and the electrode 26 (S107: NO), then the controller 30 continues the discharging detection process until the discharging detection process is completed (S108: NO). In this case, in S106, the controller 30 determines whether or not the continuous short circuit is formed between the ink-jet head 4 and the electrode 26 on the basis of the second signal outputted from the second output part 60. Further, in S107, the controller 30 determines whether or not the temporary short circuit is formed between the ink-jet head 4 and the electrode 26 on the basis of the third signal outputted from the third output part 61.

If the discharging detection process is completed (S108: YES), the controller 30 stops the output of the PWM signal (S109). Accordingly, the magnitude |Vda| of the comparing voltage Vd is decreased (for example, the ground electric potential is given). As a result, the boosting is not performed in the voltage supply circuit 51, and the magnitude |V| of the voltage V outputted from the voltage supply circuit 51 is gradually decreased. Finally, for example, the ground electric potential is given. That is, the output of the voltage from the voltage supply circuit 51 is stopped.

Subsequently, the controller 30 switches the permission signal into the signal which indicates that the boosting is not permitted (S110). Subsequently, the controller 30 switches the ON/OFF signal into the signal which indicates that the voltage supply circuit 51 is to be in the OFF state (S111).

On the other hand, if the continuous short circuit is formed between the ink-jet head 4 and the electrode 26 during the discharging detection process (S106: YES), or if the temporary short circuit is formed between the ink-jet head 4 and the electrode 26 during the discharging detection process (S107: YES), then the controller 30 interrupts the discharging detection process (S112). After executing the uncap process (S113), the controller 30 executes the processes of S109 to S111. In the uncap process of S113, the controller 30 provides the uncap state by moving the cap 21 downwardly by controlling the cap ascending/descending mechanism 38. Accordingly, the leak current hardly flows between the ink-jet head 4 and the electrode 26. The nozzles 10 are prevented from being damaged.

Further, if the continuous short circuit is formed between the ink-jet head 4 and the electrode 26 during the discharging detection process, the second signal, which is received by the second signal receiving part 63*a* of the electric discharge circuit 63, indicates that the continuous short circuit is formed between the ink-jet head 4 and the electrode 26. Accordingly, the electric discharge circuit 63 performs the electric discharge from the electrode 26. Further, if the temporary short circuit is formed between the ink-jet head 4 and the electrode 26 during the discharging detection process, the latch signal, which is received by the latch signal receiving part 63*b* of the electric discharge circuit 63, indicates that the temporary short circuit is formed between the ink-jet head 4 and the electrode 26. Accordingly, the electric discharge circuit 63 performs the electric discharge from the electrode 26. In the state in which the electric discharge circuit 63 performs the electric discharge from the electrode 26, the leak current hardly flows between the ink-jet head 4 and the electrode 26. Accordingly, the nozzles 10 are prevented from being damaged.

Further, after the process of S111, if the discharging detection process is not interrupted, i.e., if the discharging detection process is completed (S114: NO), then the controller 30 terminates the process. If the discharging detection process is interrupted (S114: YES), then the controller 30 executes the empty suction process (S115), and the controller 30 returns to S101. In the empty suction process, the controller 30 performs the empty suction by driving the suction pump 22 in the uncap state. Note that the following procedure is available in the discharging detection process which is to be started in S105 after the empty suction process in S115. That is, it may be determined whether or not the ink is discharged normally in relation to only each of the nozzles 10 other than the nozzles 10 for each of which it is already determined, before the interruption, whether or not the ink is discharged normally. Alternatively, it may be determined whether or not the inks are discharged normally in relation to all of the nozzles 10 of the ink-jet head 4.

<Effect>

According to this embodiment, it is possible to determine whether or not the liquid is discharged normally from the nozzles 10 on the basis of the first signal outputted from the first output part 58 when the inspection driving is performed.

Further, if the continuous short circuit is formed between the ink-jet head 4 and the electrode 26, the DC component of the voltage of the electrode 26 changes. In this embodiment, the second output part 60 is connected to the electrode 26 while allowing the low pass filters 59, 71 to intervene therebetween. Therefore, the second signal, which is outputted from the second output part 60, is the signal which contains the DC component with respect to the voltage fluctuation of the electrode 26. Accordingly, it is possible to more correctly detect the formation of the continuous short circuit between the ink-jet head 4 and the electrode 26 on the basis of the second signal.

Further, if the temporary short circuit is formed between the ink-jet head 4 and the electrode 26, then the voltage of the electrode 26 suddenly changes, and thus the high frequency component is generated in the voltage of the electrode 26. In this embodiment, the third output part 62 is connected to the electrode 26 while allowing the high pass filter 56 to intervene therebetween. Therefore, the third signal, which is outputted from the third output part 62, is the signal which contains the high frequency component with respect to the voltage fluctuation of the electrode 26. Accordingly, it is possible to detect the formation of the temporary short circuit between the ink-jet head 4 and the electrode 26 on the basis of the third signal.

Further, in this embodiment, the low pass filter 71, which has the effect in the direction directed from the electrode 26 to the voltage supply circuit 51, is connected between the voltage supply circuit 51 and the electrode 26. Therefore, even when the voltage fluctuation is caused in the electrode 26 by the temporary short circuit or the discharging of the ink, the voltage fluctuation is hardly transmitted to the voltage supply circuit 51. Accordingly, it is possible to suppress the fluctuation of the voltage Vd outputted from the voltage division circuit 53. Therefore, the voltage V, which is supplied from the voltage supply circuit 51, is stabilized.

Further, in this embodiment, the low pass filter 71 and the low pass filter 59 are connected between the electrode 26 and the second output part 60. Accordingly, it is possible to effectively remove the high frequency component of the voltage of the electrode 26 by means of the two low pass filters 59, 71.

Further, in this embodiment, the third output part 62 is electrically connected to the junction 52*b* of the main circuit 52 disposed between the electrode 26 and the low pass filter 71. The high pass filter 56 is connected between the third output part 62 and the junction 52*b*. Accordingly, it is possible to provide the structure in which the high pass filter 56 is connected between the electrode 26 and the third output part 62.

Further, when the third output part 62 and the high pass filter 56 are connected as described above, it is possible to connect the electrode 26 and the third output part 62 without allowing the low pass filter 71 to intervene therebetween.

Accordingly, it is possible to correctly determine whether or not the temporary short circuit is formed between the ink-jet head 4 and the electrode 26 on the basis of the third signal outputted from the third output part 62.

In this embodiment, the latch circuit 61 is connected between the high pass filter 56 and the third output part. On this account, when the temporary short circuit is formed between the ink-jet head 4 and the electrode 26, and the change appears in the voltage of the electrode 26 for a short period of time, then the information, which indicates the occurrence of the voltage change for the short period of time, is retained in the latch circuit 61. Then, the third signal, which is outputted from the third output part 62, is the signal which corresponds to the information retained in the latch circuit 61. Accordingly, it is possible for the controller 30 to accurately detect the formation of the temporary short circuit between the ink-jet head 4 and the electrode 26 on the basis of the third signal.

Further, when the temporary short circuit is once formed, there is a high possibility that the temporary short circuit may be formed again, as long as the state of the ink does not change between the electrode 26 and the ink-jet head 4. In such a situation, owing to the presence of the latch circuit 61 which can maintain the output even after the formation of the temporary short circuit, it is possible to continuously maintain the output of the latch signal during the period until the state of the ink is improved between the electrode 26 and the ink-jet head 4. Therefore, the electric discharge from the electrode 26 is continued by the electric discharge circuit 63, and it is possible to avoid the recurrence of the temporary short circuit.

Further, in this embodiment, in order to generate, in the electrode 26, the voltage change having the magnitude to such an extent that the detection can be performed when the inks are discharged from the nozzles 10 toward the electrode 26 in accordance with the inspection driving, it is necessary to increase the electric potential difference to be generated between the ink-jet head 4 and the electrode 26 by means of the voltage supply circuit 51. On this account, the DC component of the voltage outputted from the electrode 26 is the high voltage of, for example, about 500 V. On the other hand, the amount of change of the voltage of the electrode 26, which is provided when the inks are discharged from the nozzles 10 in accordance with the inspection driving, is smaller than the magnitude of the DC component of the voltage of the electrode 26.

In this embodiment, the high pass filter 56 is connected between the electrode 26 and the first output part 58. Therefore, the signal, in which the DC component (high voltage component) is removed from the voltage of the electrode 26, is sent to the first output part 58. Therefore, the first signal, which is outputted from the first output part 58, is a signal by which it is easily captured whether or not the inks are normally discharged from the nozzles 10 in accordance with the inspection driving. Further, the first output part 58 and the third output part 62 are connected to the common high pass filter 56. Therefore, it is possible to provide the simple circuit configuration of the inspection circuit 27.

Further, in this embodiment, the amount of change of the voltage of the electrode 26, which is provided when the inks are discharged from the nozzles 10 toward the electrode 26 in accordance with the inspection driving, is smaller than the amount of change of the voltage of the electrode 26 which is provided when the temporary short circuit is formed between the ink-jet head 4 and the electrode 26.

In view of the above, in this embodiment, the amplifier circuit 57 is connected between the high pass filter 56 and the first output part 58. Accordingly, when the inks are discharged from the nozzles 10 toward the electrode 26 in accordance with the inspection driving, the magnitude of the voltage of the first signal outputted from the first output part 58 is not excessively decreased. It is possible to accurately determine whether or not the inks are normally discharged from the nozzles 10 in accordance with the inspection driving on the basis of the first signal.

On the other hand, the third output part 62 is connected to the high pass filter 56 without allowing the amplifier circuit 57 to intervene therebetween. Accordingly, it is possible not to provide any excessively large magnitude of the voltage of the third signal outputted from the third output part 62.

Further, in this embodiment, the electric discharge is performed from the electrode 26 by means of the electric discharge circuit 63 when the continuous short circuit or the temporary short circuit is formed between the ink-jet head 4 and the electrode 26. Accordingly, it is possible to suppress the leak current flowing between the ink-jet head 4 and the electrode 26. It is possible to prevent the nozzles 10 from undergoing any damage which would be otherwise caused by the leak current. Further, the electric discharge circuit 63 is connected to the junction 52*d* of the main circuit 52, the junction 52*d* being positioned near to the electrode 26 and being disposed between the electrode 26 and the low pass filter 71. Therefore, when the continuous short circuit or the temporary short circuit is formed between the ink-jet head 4 and the electrode 26, it is possible to perform the electric discharge from the electrode 26 as promptly as possible.

Further, the junction 52*d*, to which the electric discharge circuit 63 is connected, is the portion of the main circuit 52 disposed near to the electrode 26 as compared with the junction 52*c* to which the second output part 60 is connected and the junction 52*b* to which the third output part 62 is connected. Also from this viewpoint, it is possible to perform the electric discharge from the electrode 26 as promptly as possible when the continuous short circuit or the temporary short circuit is formed between the ink-jet head 4 and the electrode 26.

Further, in this embodiment, the latch circuit 61 and the electric discharge circuit 63 are electrically connected to one another. The electric discharge circuit 63 switches whether or not the electric discharge is performed from the electrode 26 on the basis of the latch signal outputted from the latch circuit 61. Accordingly, if the temporary short circuit is formed between the ink-jet head 4 and the electrode 26, it is possible to perform the electric discharge from the electrode 26 as promptly as possible on the basis of the latch signal outputted from the latch signal 61. Further, if the temporary short circuit is formed between the ink-jet head 4 and the electrode 26, there is a high possibility that the temporary short circuit such as described above may be formed again. In this embodiment, the latch signal, which is outputted from the latch circuit 61, is directly inputted into the electric discharge circuit 63, and thus it is possible to continue the electric discharge of the electrode 26 until the fluctuation of the voltage of the electrode 62, which is caused by the temporary short circuit as described above, subsides. More specifically, it is possible to continue the electric discharge of the electrode 26 until the state, in which the fluctuation of the voltage of the electrode 62 is easily caused by the temporary short circuit, subsides. Then, if such a situation arises that the temporary short circuit is hardly caused and the output of the latch signal is stopped, then it is possible to stop the electric discharge.

Further, in this embodiment, the second output part 60 and the electric discharge circuit 63 are electrically connected to one another. Switching is performed for whether or not the electric discharge circuit 63 performs the electric discharge from the electrode 26 on the basis of the second signal outputted from the second output part 60. Accordingly, if the continuous short circuit is formed between the ink-jet head 4 and the electrode 26, it is possible to perform the electric discharge from the electrode 26 as promptly as possible on the basis of the second signal outputted from the second output part 60.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modified Embodiments

In the embodiment described above, the second signal receiving part 63*a* of the electric discharge circuit 63 is electrically connected to the second output part 60. Further, the latch signal receiving part 63*b* of the electric discharge circuit 63 is electrically connected to the latch circuit 61. Then, the electric discharge circuit 63 is configured so that the electric discharge is performed from the electrode 26 if the second signal, which is received by the second signal receiving part 63*a*, indicates that the continuous short circuit is formed, or if the latch signal, which is received by the latch signal receiving part 63*b* of the electric discharge circuit 63, indicates that the temporary short circuit is formed. However, there is no limitation thereto.

In a first modified embodiment, as depicted in FIG. 9, the controller 30 can output an electric discharge instruction signal which instructs an electric discharge circuit 101 to perform the electric discharge from the electrode 26. The electric discharge circuit 101 has an electric discharge instruction signal receiving part 101*a* which receives the electric discharge instruction signal. Then, the electric discharge circuit 101 is configured such that the electric discharge is performed from the electrode 26 if the electric discharge instruction signal is received by the electric discharge instruction signal receiving part 101*a*. In other words, in the embodiment described above, the signal, which is outputted from the second output part 60 and the latch circuit 61 and which corresponds to the formation of the short circuit, is received by the electric discharge circuit 63 without allowing the controller 30 to intervene therebetween. On the contrary, in the first modified embodiment, the signal, which is outputted from the second output part 60 and the latch circuit 61 and which corresponds to the formation of the short circuit, is received by the controller 30. The electric discharge instruction signal, which instructs the electric discharge circuit 101 to perform the electric discharge, is outputted by the controller 30 on the basis of the received signal.

In the first modified embodiment, if the inspection instruction signal is received, the controller 30 performs the process in accordance with the flow depicted in FIGS. 10A and 10B. This procedure will be explained in more detail below. That is, if the inspection instruction signal is received, the controller 30 executes the processes of S101 to S115 in the same manner as the embodiment described above. However, in the first modified embodiment, unlike the embodiment described above, if the signal, which corresponds to the formation of the short circuit between the ink-jet head 4 and the electrode 26, is received in S106 or S107, then the controller 30 outputs the electric discharge instruction signal to the electric discharge circuit 101 (S201), and then the controller 30 proceeds to S112.

In the first modified embodiment, if it is determined that the continuous short circuit or the temporary short circuit is formed between the ink-jet head 4 and the electrode 26, the controller 30 outputs the electric discharge instruction signal to the electric discharge circuit 101. Then, if the electric discharge instruction signal is received, the electric discharge circuit 101 performs the electric discharge from the electrode 26. Accordingly, it is possible to perform the electric discharge from the electrode 26 if the continuous short circuit or the temporary short circuit is formed between the ink-jet head 4 and the electrode 26.

Further, the electric discharge circuit may have both of the second signal receiving part 63*a* and the latch signal receiving part 63*b* of the embodiment described above and the electric discharge instruction signal receiving part 101*a* of the first modified embodiment. Then, the following configuration is also available. That is, the electric discharge circuit 63 performs the electric discharge from the electrode 26 if the second signal, which is received by the second signal receiving part 63*a*, indicates that the continuous short circuit is formed, if the latch signal, which is received by the latch signal receiving part 63*b* of the electric discharge circuit 63, indicates that the temporary short circuit is formed, or if the electric discharge instruction signal is received by the electric discharge instruction signal receiving part 101*a*. Further, the electric discharge circuit may have any one of the second signal receiving part 63*a* and the latch signal receiving part 63*b* of the embodiment described above, and the electric discharge instruction signal receiving part 101 of the first modified embodiment.

Further, in the embodiment described above, the electric discharge circuit 63 is connected to the junction 52*d* of the main circuit 52 disposed between the electrode 26 and the low pass filter 71. Then, the junction 52*d* is the portion of the main circuit 52 disposed nearer to the electrode 26 as compared with the junction 52*c* to which the second output part 60 is connected and the junction 52*b* to which the third output part 62 is connected. However, there is no limitation thereto.

For example, the electric discharge circuit 63 may be connected to the junction of the main circuit 52 disposed between the electrode 26 and the low pass filter 71, the junction (an example of the "third junction" of an aspect of the invention) being disposed farther from the electrode 26 as compared with at least one of the junctions 52*b*, 52*c*.

Further, for example, the electric discharge circuit 63 may be connected to the junction of the main circuit 52 other than the portion disposed between the electrode 26 and the low pass filter 71, the junction (an example of the "third junction" of an aspect of the invention) being disposed nearer to the electrode 26 as compared with the junctions 52*b*, 52*c*.

Further, for example, the electric discharge circuit 63 may be connected to the junction of the main circuit 52 other than the portion disposed between the electrode 26 and the low pass filter 71, the junction being disposed farther from the electrode 26 as compared with at least one of the junctions 52*b*, 52*c*. Further, the electric discharge circuit 63 may be connected to the electrode 26 without allowing the main circuit 52 to intervene therebetween. Further, it is also allowable that the electric discharge circuit for performing the electric discharge from the electrode 26 is not provided.

Further, in the embodiment described above, the high pass filter 56 and the first output part 58 are connected to one another while allowing the amplifier circuit 57 to intervene therebetween, and the high pass filter 56 is connected to the third output part 62 without allowing the amplifier circuit 57 to intervene therebetween. However, there is no limitation thereto. For example, when the controller 30 can detect any small voltage change at the first output part 58, it is also allowable that the amplifier circuit 57 is not connected between the high pass filter 56 and the first output part 58.

Further, in the embodiment described above, the high pass filter 56 is connected between the first output part 58 and the junction 52*b*, and thus the high pass filter 56 is connected to the first output part 58 and the third output part 62. However, there is no limitation thereto. For example, the electrode 26 and the third output part 62 may be connected to one another while allowing the high pass filter 56 to intervene therebetween, and the electrode 26 and the first output part 58 may be connected to one another without allowing the high pass filter 56 to intervene therebetween. In this case, it is also allowable that any high pass filter, which is distinct from the high pass filter 56, may be connected between the electrode 26 and the first output part 58. That is, the high pass filter, which is connected between the electrode 26 and the first output part 58, may be distinct from the high pass filter which is connected between the electrode 26 and the third output part 62. Alternatively, it is also allowable that any high pass filter is not connected between the electrode 26 and the first output part 58.

Further, in the embodiment described above, the latch circuit 61 is connected between the high pass filter 56 and the third output part 62. However, there is no limitation thereto. For example, as for the electric discharge circuit 63 and/or the controller 30, if the received voltage change in a short period of time can be correctly detected, it is also allowable that the latch circuit 61 is not connected between the high pass filter 56 and the third output part 62.

Further, in the embodiment described above, the third output part 62 is connected to the junction 52*b* of the main circuit 52, and the high pass filter 56 is connected between the junction 52*b* and the third output part 62. However, there is no limitation thereto. For example, it is also allowable that the electrode 26 and the third output part 62 are connected to one another without allowing the main circuit 52 to intervene therebetween, and the high pass filter 56 is connected between the electrode 26 and the third output part 62.

Further, in the embodiment described above, the low pass filter 71 provided in the main circuit 52 and the low pass filter 59 provided outside the main circuit 52 are connected between the electrode 26 and the second output part 60. However, there is no limitation thereto. It is also allowable that only the low pass filter 59 provided in the main circuit 52 is connected between the electrode 26 and the second output part 60. Alternatively, it is also allowable that only the low pass filter 59 provided outside the main circuit 52 is connected between the electrode 26 and the second output part 60.

Further, in the embodiment described above, it is also allowable that the low pass filter 59 and the low pass filter 71 are omitted. Also in an embodiment in which the low pass filter 59 and the low pass filter 71 are not provided, it is possible to detect the continuous short circuit by using the second output part 60. Specifically, for example, if the voltage V2 of the second signal outputted from the second output part 60 is not more than a predetermined threshold value continuously for a predetermined period, it may be assumed that the continuous short circuit is formed.

Further, in the embodiment described above, the first output part 58 is electrically connected to the electrode 26. However, there is no limitation thereto. For example, in a second modified embodiment, as depicted in FIG. 11, a first output part 111 is connected to the ink-jet head 4, and an amplifier circuit 112 is connected between the first output part 111 and the ink jet head 4. Further, the ink-jet head 4 is connected to the ground. Note that although not depicted, the first output part and the amplifier circuit are not connected to the electrode 26 in the second modified embodiment.

When the inspection driving is performed in a state in which the electric potential difference is generated between the ink-jet head 4 and the electrode 26, the voltage change is caused in any one of the ink-jet head 4 and the electrode 26. Therefore, even when the first output part 111 is connected to the ink-jet head 4, it is possible to determine whether or not the inks are normally discharged from the nozzles 10 on the basis of the first signal outputted from the first output part 111. Note that it is also allowable in the second modified embodiment that the amplifier circuit 112 is not connected between the ink-jet head 4 and the first output part 111 in the same manner as described above. Further, it is also allowable that any filter is connected between the ink-jet head 4 and the ground. This filter is provided in order that the amplitude of the signal, created by the discharging of the ink by the ink-jet head 4, is not decreased in relation to such configuration that the first output part 111 is connected to the ink-jet head 4 while the voltage is supplied to the electrode 26. It is possible to further increase the signal outputted from the first output part 111 by providing the filter.

Further, in the embodiment described above, the comparing signal is outputted from the comparing circuit 55 on the basis of the magnitude correlation between the magnitude |Vd| of the voltage Vd outputted from the voltage division circuit 53 and the magnitude |Va| of the comparing voltage Va generated in the comparing voltage generating circuit 54. Then, whether or not the boosting is performed is switched in the voltage supply circuit 51 on the basis of the comparing signal, and thus the voltage is outputted from the voltage supply circuit 51 to apply the voltage to the electrode 26. However, there is no limitation thereto. The voltage may be applied to the electrode 26 by means of any voltage supply unit configured differently from the above.

Further, in the embodiment described above, the inspection driving is performed for all of the nozzles 10 of the ink-jet head 4 to determine whether or not the inks are normally discharged from the nozzles 10. However, there is no limitation thereto. For example, the inspection driving may be performed for only some of the nozzles 10 of the ink-jet head 4, for example, for only alternate nozzles 10 on each of the nozzle arrays 9 to determine whether or not the inks are discharged normally from the nozzles 10. Then, as for the other nozzles 10, it is also allowable to estimate whether or not the inks are discharged normally from the nozzles 10 on the basis of the determination result about the some of the nozzles 10 described above.

Further, in the examples described above, the first signal, which is outputted from the first output part, is the signal which depends on whether or not the ink is discharged from the nozzle 10. Then, if the first signal indicates that the ink is discharged from the nozzle 10, it is determined that the ink is normally discharged from the nozzle 10. However, there is no limitation thereto. The first signal may be any signal which corresponds to any other discharging mode distinct from whether or not the ink is discharged, including, for example, the discharging direction and the discharging speed of the ink. Then, it is also allowable to determine that the ink is normally discharged from the nozzle 10 when the first signal indicates that the ink is discharged from the nozzle 10 in accordance with the predetermined discharging mode.

Further, in the foregoing description, the example has been explained, in which the present disclosure is applied to the printer provided with the so-called serial head for discharging the inks from the plurality of nozzles while moving in the scanning direction together with the carriage. However, there is no limitation thereto. For example, the present disclosure can be also applied to a printer provided with a so-called line head extending over the entire length of the recording paper in the scanning direction.

Further, in the foregoing description, the example has been explained, in which the present disclosure is applied to the printer for performing the recording on the recording paper P by discharging the inks from the nozzles. However, there is no limitation thereto. The present disclosure is also applicable to any printer for recording an image on a recording medium other than the recording paper, including, for example, T-shirt, sheets for outdoor advertisement, cases for mobile phone terminals such as smartphones or the like, corrugated cardboards, and resin members. Further, the present disclosure is also applicable to any liquid discharging apparatus for discharging any liquid other than the ink, including, for example, resins and metals in liquid states.

What is claimed is:

1. A liquid discharging apparatus comprising:

a liquid discharging head having a nozzle configured to discharge a liquid;

an electrode arranged so that the electrode is capable of being opposed to the nozzle;

a voltage supplier configured to generate an electric potential difference between the liquid discharging head and the electrode by applying a voltage to the electrode;

a first output part electrically connected to the electrode or the liquid discharging head, the first output part being configured to output a first signal corresponding to an electric change, of the electrode or the liquid discharging head electrically connected to the first output part, caused in a case that the liquid discharging head performs inspection driving for discharging the liquid from the nozzle toward the electrode while the liquid discharging head and the electrode are opposed to one another;

a second output part electrically connected to the electrode;

a high pass filter electrically connected to the electrode;

a third output part electrically connected to the electrode via the high pass filter; and a controller, wherein:

the controller is configured to:

determine whether or not the liquid is normally discharged from the nozzle based on the first signal; and determine whether or not a short circuit is formed between the liquid discharging head and the electrode based on a second signal outputted from the second output part and a third signal outputted from the third output part.

2. The liquid discharging apparatus according to claim 1, further comprising a low pass filter electrically connected to the electrode, wherein:

the second output part is electrically connected to the electrode via the low pass filter.

3. The liquid discharging apparatus according to claim 2, further comprising a main circuit electrically connecting the voltage supplier and the electrode, wherein:

the low pass filter includes a first low pass filter provided in the main circuit; and the second output part is electrically connected to a first junction, of the main circuit, disposed between the voltage supplier and the first low pass filter.

4. The liquid discharging apparatus according to claim 3, wherein the low pass filter further includes a second low pass filter distinct from the first low pass filter, and the second low pass filter is connected between the first junction and the second output part.

5. The liquid discharging apparatus according to claim 3, wherein:

the third output part is electrically connected to a second junction, of the main circuit, disposed between the electrode and the low pass filter; and the high pass filter is connected between the third output part and the second junction.

6. The liquid discharging apparatus according to claim 5, further comprising a latch circuit connected between the high pass filter and the third output part.

7. The liquid discharging apparatus according to claim 6, further comprising an electric discharger configured to perform electric discharge from the electrode, wherein:

the electric discharger is electrically connected to the latch circuit, and the electric discharger is configured to switch between performing the electric discharge from the electrode and not performing the electric discharge from the electrode, based on a signal outputted from the latch circuit.

8. The liquid discharging apparatus according to claim 5, wherein:

the first output part is electrically connected to the second junction; and the high pass filter is connected between the first output part and the second junction.

9. The liquid discharging apparatus according to claim 8, further comprising an amplifier circuit which is connected between the high pass filter and the first output part, wherein:

the third output part is connected to the high pass filter without the amplifier circuit being intervened between the third output part and the high pass filter.

10. The liquid discharging apparatus according to claim 3, further comprising an electric discharger configured to perform electric discharge from the electrode, wherein:

the electric discharger is electrically connected to a third junction, of the main circuit, disposed between the electrode and the low pass filter.

11. The liquid discharging apparatus according to claim 1, further comprising:

a main circuit electrically connecting the voltage supplier and the electrode; and an electric discharger configured to perform electric discharge from the electrode, wherein:

each of the second output part and the third output part is electrically connected to the main circuit; and the electric discharger is electrically connected to a third junction, of the main circuit, disposed near to the electrode as compared with a portion at which the second output part is connected to the main circuit and a portion at which the third output part is connected to the main circuit.

12. The liquid discharging apparatus according to claim 1, further comprising an electric discharger configured to perform electric discharge from the electrode, wherein:

the electric discharger is electrically connected to the second output part, and the electric discharger is configured to switch between performing the electric discharge from the electrode and not performing the electric discharge from the electrode, based on the second signal.

13. The liquid discharging apparatus according to claim 1, further comprising an electric discharger configured to perform electric discharge from the electrode, wherein:

the controller is configured to output an electric discharge instruction signal to the electric discharger to instruct the electric discharger to perform the electric discharge from the electrode, in a case that a short circuit is determined to be formed between the liquid discharge head and the electrode based on the second signal or the third signal; and the electric discharger is configured to perform the electric discharge from the electrode in a case that the electric discharger receives the electric discharge instruction signal.

* * * * *